Sept. 2, 1969          H. WURZEL          3,464,307
RETAINING RINGS
Filed April 29, 1968          2 Sheets-Sheet 2
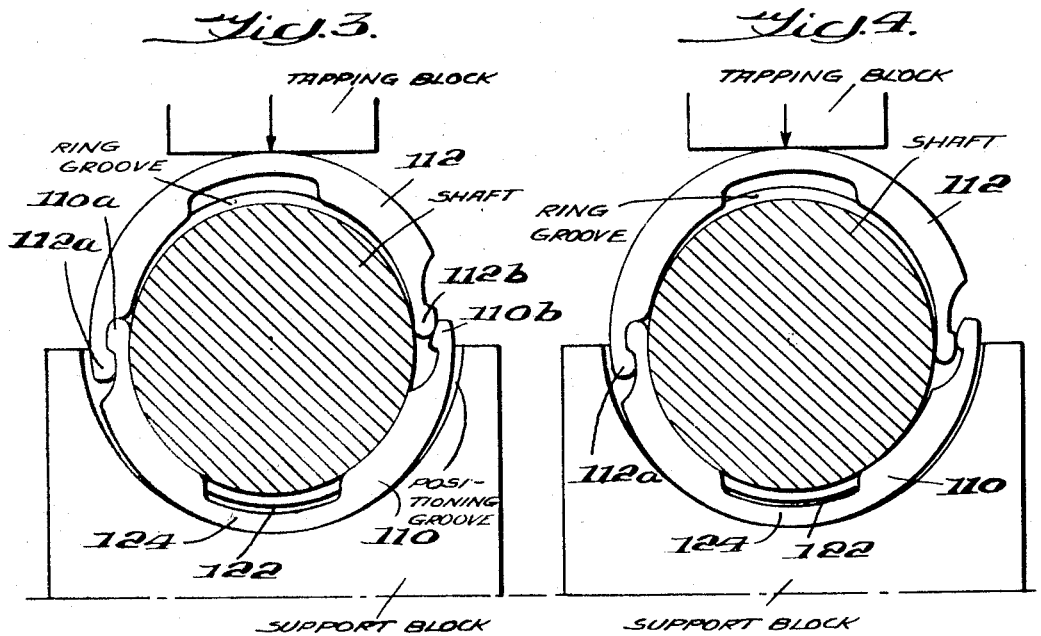
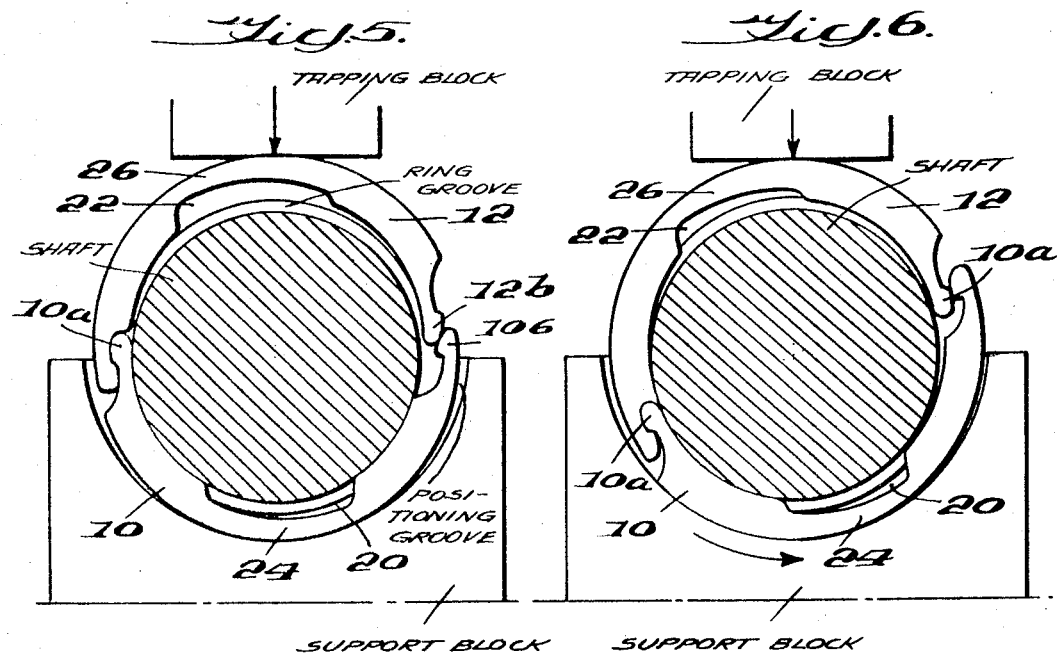
INVENTOR
HUGO WURZEL,
BY
ATTORNEY United States Patent Office 3,464,307
Patented Sept. 2, 1969

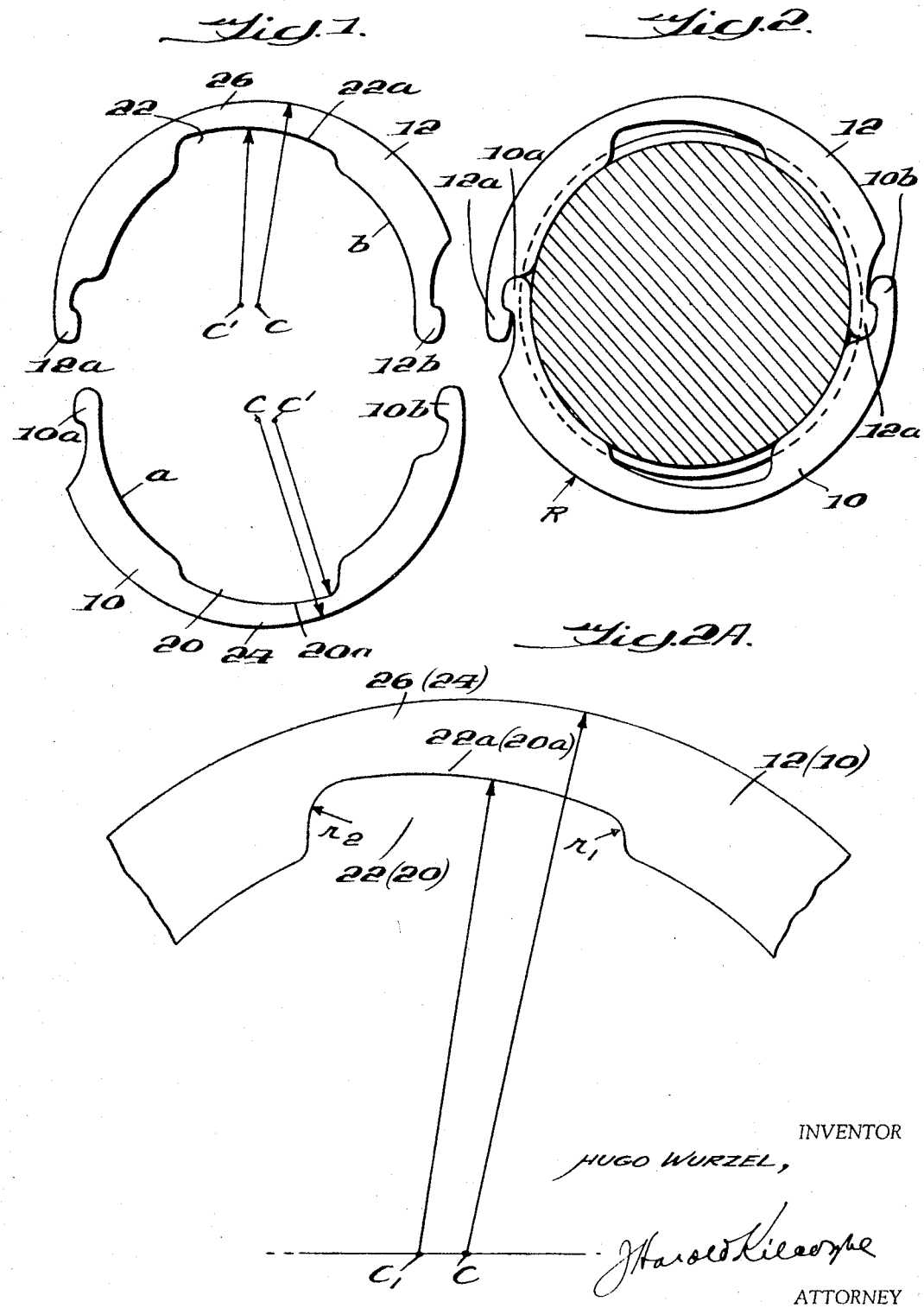

1

3,464,307
RETAINING RINGS
Hugo Wurzel, New York, N.Y., assignor to Waldes Kohinoor, Inc., Long Island City, N.Y., a corporation of New York
Filed Apr. 29, 1968, Ser. No. 725,122
Int. Cl. F16b 21/18, 43/00
U.S. Cl. 85—8.8                                    2 Claims

ABSTRACT OF THE DISCLOSURE

An interlocking retaining ring comprising ring halves of identical shape adapted to be assembled together, wherein each ring half includes an outwardly facing hook at one end and an inwardly facing hook at its other end. Each ring half also includes an inner edge recess defining a bridge portion connecting the ends thereof with the section height of the bridge portion decreasing progressively toward the end having the inwardly facing hook.

---

This invention relates to improvements in retaining rings and more particularly in interlocking retaining rings of the general type disclosed and claimed in the patent to Heimann et al. No. 2,547,263, dated April 3, 1951, which with the present application is commonly owned.

Continuing experience with interlocking two-part retaining rings according to said Heimann et al. Patent No. 2,547,263 has revealed that, while they perform satisfactorily and are widely employed in ring-shaft assemblies of a nature requiring or making advisable the use of a retaining ring which is fabricated in half sections capable of being united in their assembly in a shaft groove by being brought together in the plane of said groove, such rings are open to the objection of being sensitive to any variation in their free diameter from the precise diameter computed to be the correct diameter.

In explanation, interlocking two-part rings according to said Heimann et al. patent are characterized by the provision of inner-edge arcuate recesses disposed symmetrically to the vertical center lines of the two ring parts or halves which, by decreasing the section height of each ring half in its middle length portion, was intended to impart the flexibility to the ring halves requisite to the complemental hooks provided at the ends thereof (whose ability to deflect in assembly is negligible) properly interengaging and interlocking with one another during ring assembly, without the ring halves or either of them deflecting beyond the elastic limit. However, since the principal recess-defining edges, i.e. the recess bottom edges, of said ring halves according to said Heimann et al. design are concentric with the outer edges of said ring halves, as results in the so-called "bridges," i.e. the narrow section-height portions which extend between and connect the non-recessed arcuate length portions of the ring halves, having uniform section height, the provision of said inner-edge recesses in an interlocking ring according to the prior Heimann et al. design has not yielded the favorable results expected thereof.

More particularly, to assemble such a ring according to the Heimann et al. design by the recommended procedure, the relatively lower half of the ring is placed in a positioning groove provided therefor in the upwardly opening shaft recess of a support block, the shaft which is to receive the ring is lowered into the block recess in axial position such that its groove first registers with an then seats the inner edge of said lower ring half, the relatively upper ring half is then related to the lower ring half by interengaging its inwardly facing hook with the complemental outwardly facing hook of said lower ring half and finally, said upper ring half is pushed down by means of a tapping block which applies a downward force thereto in the direction of its center line until the lower ring half opens by an amount enabling its inwardly facing hook to ride over and then fully interengage with the complemental, outwardly facing hook of the upper ring half.

It will be seen that in such assembly operation not only is said lower ring half exclusively called upon to deflect substantially the full amount requisite to the complete interengagement of the complemental hooks of the ring halves, but also, because the interengaging force applied to said lower ring half is in the vertical center line thereof and hence bending occurs only from said center line, said full amount of deflection takes place only in that half of the bridge of the lower ring half which extends between its vertical center line and its inwardly facing end hook. Since this deflection should be kept within the elastic limit, the permissible amount of deflection is relatively small, and such imposes serious limitations on the use of retaining rings according to the known Heimann et al. design.

Stated broadly, an object of the invention is the provision of an improved design of a two-part interlocking retaining ring, each part (half) of which is provided with a recess in its inner periphery, which is so constructed and arranged that the entire length of the bridge extending between the non-recessed arcuate inner-edge portions of each said ring can deflect in ring assembly, thereby substantially increasing the amount which each ring half may deflect without increase in the bending stress exerted during interlocking of the ring halves, as compared to generally similar rings according to the prior design as disclosed and claimed in the Heimann et al. Patent No. 2,547,263.

The above and other objects and features of advantage of an interlocking retaining ring of the present invention will be set forth or be apparent from the following detailed description thereof, taken with the accompanying illustrative drawings, wherein FIG. 1 is a plan view of the two ring halves making up the improved retaining ring of the invention shown in their separated relation;

FIG. 2 is an end view, partly in section, illustrating an interlocking retaining ring according to the invention assembled to a shaft and seated in the groove thereof;

FIG. 2A is a fragmentary view of the recessed edge portion of a ring half on an enlarged scale;

FIGS. 3 and 4 are views illustrating successive stages of assembly of a prior design of interlocking retaining ring which the present design seeks to improve;

FIGS. 5 and 6 are views corresponding to FIGS. 3 and 4 which illustrate the functioning of an interlocking ring according to the present improved design during the operation of assembling same on its shaft.

Referring to said drawings in detail, a two-part interlocking retaining ring as herein contemplated comprises the two identical ring halves designated 10, 12 which in assembly are adapted to complement one another in forming a full-circular annulus R (FIG. 2) capable of serving as an artificial shaft shoulder for retaining parts such as bearing races, gears, etc. in fixed axial position on said shaft. To provide for their interlocking one with the other, said ring halves 10 and 12, which have inner-edge diameter substantially equal to that of the circle of the bottom of the shaft groove in which they are to be assembled and which are preferably stamped complete from spring metal, are provided at their opposite ends with complemental hooks shaped to interengage when said halves are so assembled one to the other. More particularly, the hooks 10a, 12a and 10b, 12b at the corresponding opposite ends of said ring halves are formed to face in opposite directions, that is to say, the hook 10a at one end of the ring half 10 faces outwardly and the hook 12a at the corresponding end of the other ring half 12 faces inwardly, whereas the hooks 10b, 12b at the other corresponding ends of said ring halves are so formed that they face inwardly and outwardly, respectively.

The ring halves 10 and 12 are moreover provided in their respective middle length adjacent portions with arcuately extending, inner-edge recesses designated 20, 22 which are disposed symmetrically to the sides of the ring-half center lines. The provision of such recesses results in the formation of so-called bridges 24, 26 of less section height than that of the non-recessed adjacent portions of the ring halves disposed to the opposite sides of said recesses. Thus, it will be seen that to the extent so far described a two-part interlocking ring of the present invention is similar to the known two-part interlocking ring disclosed and claimed in the aforesaid Heimann et al. Patent No. 2,547,263.

However, as distinguished from said bridges 24, 26 having uniform section height throughout their arcuate length, as characterizes the bridges formed according to the prior Heimann ring design, it is a feature of the present invention that said bridges have section height which tapers, i.e. progressively decreases, substantially from end to end thereof, and further that such taper or progressive decrease is in the direction of the inwardly directed end hooks 10b, 12a of the respective ring halves.

Such progressive decrease in section height of the bridges 24, 26 may be simply provided by striking the principal recess-defining edges, i.e. the bottom edges 20a, 22a, of said recesses from a center $C_1$ which is displaced laterally from the center C from which the outer and inner edges of the ring halves proper are struck, by a calculated amount which determines the proper taper of said bridges. Preferably also, the end-defining edges of the recesses, i.e. those edges which connect said recess bottom-edges 20a, 22a with the inner edges proper a and b of said ring halves 10 and 12, rather than being formed as straight end edges, instead extend along the radii $r_1$ and $r_2$, of which the radius $r_1$ at the shallower end of the recess (at which the bridge has greatest section height) is small as compared to radius $r_2$ at the deeper end of the recess.

The major advantages of an interlocking retaining ring of the invention over the interlocking retaining ring of the prior Heimann et al. design can best be explained by a comparison of the functioning of rings of the two designs when being assembled to their respective shafts and to one another. Referring to FIGS. 3 and 4, which depict successive stages of assembling a ring of the Heimann et al. design, the ring half 110 is shown as already placed in a "positioning groove" provided therefor in the shaft-receiving recess of a "support block" into which the "shaft" has been lowered in position to receive the so placed ring-half in its "ring groove." FIG. 3 shows that the complemental ring half 112 has been preliminarily related to said ring half 110 by engaging its inwardly directed or facing end hook 112a with the outwardly facing end hook 110a of said ring half 110, all as permitted by the structure of said ring parts. The remaining problem being to interengage the end hooks 110b, 112b at the opposite ends of the ring halves, such is effected by lowering a "tapping block" on to the outer periphery of the upwardly disposed ring half 112 and by tapping same, applying a downward force on said upper ring half 112 as results in the inwardly facing hook 110b by its engagement with the outwardly directed hook 112b of the upper ring half, opening said lower ring half by an amount as enables said hook 110b to ride over and thereupon lockingly engage with said hook 112b.

Thus, to interengage the hooks 110b, 112b, not only must all bending take place in the lower ring half 110, such because it is this half which must open or spread sufficiently to permit its inwardly facing hook 110b to ride over the complemental hook 112b, but also, because of the uniform section height of the bridge 124 resulting from the provision of the recess 122 as enables said lower ring half to bend and additionally because the forces applied by the "tapping block" are in the direction of the vertical center line of said ring half 110 which is also the center line of said bridge 124, the bending required to interengage the hooks 110b, 112b as aforesaid actually occurs in that half of said bridge 124 which extends between its center line and its end adjacent said inwardly directed end hook 110b. Obviously, such a concentration of bending stresses makes the ring according to the prior design extremely sensitive to any variation in its free diameter.

Now considering FIGS. 5 and 6 intended to illustrate the assembly procedure recommended for an interlocking retaining ring of the improved design according to the present invention, it will be seen that such is the same as that just described for the ring of the prior Heimann et al. design. However, when the upper ring half 12 is tapped down by the "tapping block," the lower ring half 10 (when its hooks 10a, 10b are positioned as shown) will slide counter-clockwise in its "positioning groove" to an adjusted angular position in which its largest section-height line substantially coincides with the vertical center line of the shaft-ring-support block assembly. Such in effect shifts the line from which bending of the lower half 10 of the ring will occur toward that end of the bridge 24 having greater section height, with the favorable result that substantially the entire length of said bridge can deflect. This in turn increases the amount of permissible elastic deformation by the square of the increased length of the bridge in which bending can occur and, due to the tapered configuration of the bridge, an additional one-third increase is attainable without increase of ring stressing, as compared with the bridge of uniform section. Also, because of the relatively large section-height of the bridge at one end of each recess (20 or 22) and the large connecting radius $r_2$ between recess bottom edge and ring body edge at the other recess end, a much better continuity of the stress lines in bending is achieved, which reduces the stress concentration factor in the largest section of the bridge incident to ring-half bending during assembly or disassembly.

Another feature of advantage of the tapered bridge characterizing the edge-recessed interlocking ring of the invention is that the larger-end section of the bridge considerably reduces deformation and hence changes in the free ring diameter consequent to the heat treatment thereof. Such assures better and tighter fit of the rings of the invention in their grooves.

Yet a further advantage resides in greater ring-half securement. More particularly, in a ring according to the invention, the forces holding the ring halves together are much greater than those attainable in the comparable ring of the prior Heimann et al. design. Such follows from the fact that such forces increase by the square of the increased maximum section of the ring without corresponding increase of the bending stresses exerted during interlocking of the ring-part hooks.

Interlocking rings with tapered section height bridges according to the present invention also have the advantage of facilitating the design of such rings, since the arcuate length of the bridge coordinates with the maximum section height. This is to say that if the bridge is longer, the maximum section height of the ring can be increased, resulting in the same stresses and the same amount of deflection. On the other hand, if a stiffer ring with less deflection is required, such can be accomplished by reducing the bridge length or increasing its maximum section height, or both. Also, if rings with larger outer diameters, or, conversely, if rings with smaller outer diameters are required, the tapered bridge feature will be an advantage for the ring designer. This is of practical importance, particularly in cases of smaller outer diameters wherein, due to the taper of the bridge, the holding power of the hooks will be sufficient to assure good functioning of the ring; this cannot be so easily achieved with a ring with a uniform section bridge.

Also to be noted is the fact that the ring halves characterized by the tapered and hence non-symmetrical section height bridge according to the improved design of the present invention are just as interchangeable as ring halves characterized by the uniform section-height bridge according to the aforesaid Heimann et al. Patent No. 2,547,263, this despite the long prevalent belief held by persons highly skilled in the interlocking retaining ring field that for interchangeability of ring halves a symmetrical section-height bridge was necessary.

As many changes could be made in carrying out the above constructions it is intended that all matter contained in the above description or shown in the accompanying drawing shall be interpreted as illustrative and not in a limiting sense.

I claim:

1. An interlocking machine-part retaining ring for forming a retaining shoulder on a shaft and the like provided with a ring seating groove, comprising ring halves of identical shape adapted to be assembled one to the other with their inner edges seated in said groove and when so assembled to form a complete annulus, each ring half having an outwardly facing hook at one end and an inwardly facing hook at its other end and the outwardly facing hook of each ring half being adapted to interlock with the inwardly facing hook of each other ring half when the ends of said ring halves are brought together in mutually engaging relationship, each ring half also having an arcuately extending inner-edge recess in its middle length portion which results in the formation of a bridge of lesser section height than that of the adjacent end-length portions of the ring half and which extends between and connects said end-length portions, each said bridge having section height which decreases progressively substantially from end-to-end thereof towards the one end of the ring half which is provided with said inwardly facing hook.

2. An interlocking machine-part retaining ring according to claim 1, wherein the end edges of said recess which connect the recess-defining edge proper of each ring half with the inner edge proper of each ring half extend along radii of different length, the radius at the shallower end of the recess at which the section height of the bridge is greatest being the smaller.

References Cited
UNITED STATES PATENTS

| | | | |
|---|---|---|---|
| 2,547,263 | 4/1951 | Heimann et al. | 85—8.8 |
| 3,162,084 | 12/1964 | Wurzel | 85—8.8 |

RAMON S. BRITTS, Primary Examiner

U.S. Cl. X.R.

85—51